3,681,292
POLYFLUOROCYANURATE POLYMERS AND
PROCESS OF PREPARATION
Basil L. Loudas, St. Paul, and Herward A. Vogel, Oakdale, Minn., assignors to Minnesota Mining and Manufacturing Company, St. Paul, Minn.
No Drawing. Continuation-in-part of application Ser. No. 741,308, July 1, 1968. This application Mar. 30, 1971, Ser. No. 129,601
Int. Cl. C07d 55/00; C08g 22/00
U.S. Cl. 260—77.5 NC
10 Claims

ABSTRACT OF THE DISCLOSURE

Methylol-terminated fluorocarbons are reacted with cyanogen halides to produce fluorocarbon cyanates which can be polymerized to produce polyfluorocyanurates having chemical resistance and thermal stability and useful in making shaped plastic or elastomeric articles.

CROSS-REFERENCES TO RELATED APPLICATIONS

This application is a continuation-in-part of copending application Ser. No. 741,308, filed July 1, 1968 now abandoned.

FIELD OF THE INVENTION

This invention relates to fluorocarbon cyanates and to a method for their preparation. In another aspect, it relates to fluorocarbon cyanurate polymers which can be prepared from said cyanates and to a method for the preparation of said polymers. In a further aspect, it relates to shaped plastic or elastomeric articles made from said cyanurate polymers.

DESCRIPTION OF THE PRIOR ART

Prior art that discloses a fluorocarbon cyanate is that by E. Grigat et al. in Chem. Ber., 97, 3012 (1964), the cyanate disclosed there being a comparatviely simple low molecular weight compound, viz 2,2,2 - trifluoroethyl cyanate, prepared by reacting an acidic aliphatic alcohol with cyanogen chloride in the presence of triethylamine. German Pat. 1,190,184 discloses polyfunctional cyanic acid aromatic esters (devoid of any fluorine substitution) and their polymerization to form polycyanurate polymers having a plurality of cyanurate rings linked by aromatic nuclei.

BRIEF SUMMARY OF THE INVENTION

Briefly, in one aspect of this invention, a novel class of fluorocarbon cyanates are provided, the members of which have one or a multiplicity (i.e., block) of perfluoromethylene units and/or perfluoro(trifluoromethyl)methylene units, and blocks of said units can be separated by ether linkages or methylene linkages, and where said cyanates are terminated with (1) a trifluoromethyl group, $CF_3$, on one end and are terminated with a cyanatomethyl group, —$CH_2OCN$, at the other end (as in the case of monocyanates), or (2) terminated on each end with a cyanatomethyl group (as in the case of dicyanates). These cyanates, in another aspect of this invention, are prepared by reacting respective methylol-terminated fluorocarbons with cyanogen halides in the presence of a base, such as triethylamine. In another aspect of this invention, said cyanates are thermally polymerized to form fluorocyanurate polymers which can be readily fabricated to form shaped plastic or elastomeric articles having chemical resistance and thermal stability.

DETAILED DESCRIPTION OF INVENTION

The fluorocarbon cyanates of this invention, briefly described above, preferably are monocyanates of the general formula:

$$F_3C(CFX)_aA(CFX)_bCH_2OCN \qquad (I)$$

where
A is a carbon-to-carbon bond (in which case subscript $a$ is 1 to 30 and subscript $b$ is zero) or

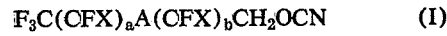

(in which case subscript $a$ is 1 to 10, subscript $b$ is 1 and subscript $c$ is 1 to 100), and dicyanates of the general formula:

$$NCOCH_2(CFX)_aB(CFX)_bCH_2OCN \qquad (II)$$

where
B is (1) a carbon-to-carbon bond, in which case $a$ is an integer of 1 to 30 and $b$ is zero, or (2) B is $$[(CFX)_dO(CFX)_e]_f$$

in which case $a$ and $b$ are zero, $d$ and $e$ are integers of 1 to 30, and $f$ is an integer of 1 to 20, or (3) B is $(OCF_2—CFX)_gO(CFX)_hO(CFX—CF_2O)_i$, in which case $a$ and $b$ are 1, $h$ is an integer of 1 to 10, and $g$ and $i$ are integers of 1 to 100, or (4) B is $$[(CF_2CH_2)_j(CF_2—CFX)_k]_m$$

in which case $a$ and $b$ are integers of 1 to 10, $j$ and $k$ are integers whose ratio $j/k$ is 1/1 to 10/1, $m$ is an integer of 1 to 100, and ($CF_2CH_2$) and ($CF_2—CFX$) are randomly distributed units;
and where X in all instances where it appears in Formulas I and II is fluorine or perfluoroalkyl.

Particularly useful subclasses of monocyanates falling within the general scope of Formula I are those of the general formulas:

$$F_3C(CFX)_mCH_2OCN \qquad (III)$$

where
X is fluorine or a perfluoroalkyl group with 1 to 10 carbon atoms, and $m$ is an integer of 1 to 30;
and

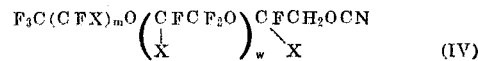 (IV)

where
X is fluorine or a perfluoroalkyl radical of 1 to 10 carbon atoms, $m$ is an integer from 1 to 10, and $w$ is an integer of 1 to about 100.

Particularly useful subclasses of dicyanates coming within the scope of general Formula II are those of the general formulas:

$$NCOCH_2(CFX)_mCH_2OCN \qquad (V)$$

where
X is fluorine or a perfluoroalkyl group of 1 to 10 carbon atoms, and $m$ is an integer from 1 to 30;

$$NCOCH_2[(CFX)_mO(CFX)_o]_pCH_2OCN \qquad (VI)$$

where

X is fluorine or a perfluoroalkyl group of 1 to 10 carbon atoms, and $m$ and $o$ are integers of 1 to 12, and $p$ is an integer of 1 to 20;

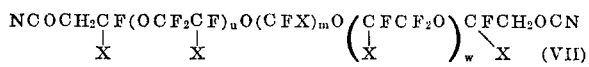

$$NCOCH_2CF(OCF_2CF)_uO(CFX)_mO\left(CFCF_2O\right)_w CFCH_2OCN \quad (VII)$$
$$\phantom{NCOCH_2C}\!|\phantom{F(O}\!|\phantom{CF_2CF)_uO(CFX)_mO(}\!|\phantom{CF_2O)_w}\!|$$
$$\phantom{NCOCH_2C}X\phantom{F(O}X\phantom{CF_2CF)_uO(CFX)_mO(}X\phantom{CF_2O)_w}X$$

where

X is fluorine or a perfluoroalkyl group having 1 to 10 carbon atoms, $m$ is an integer of 1 to 10, and $u$ and $w$ are integers of 1 to about 100;

and

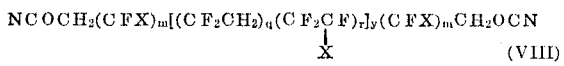

$$NCOCH_2(CFX)_m[(CF_2CH_2)_q(CF_2CF)_r]_y(CFX)_mCH_2OCN \quad (VIII)$$
$$\phantom{NCOCH_2(CFX)_m[(CF_2CH_2)_q(CF_2C}\!|$$
$$\phantom{NCOCH_2(CFX)_m[(CF_2CH_2)_q(CF_2C}X$$

where

X is fluorine or a perfluoroalkyl group, having 1 to 10 carbon atoms, $m$ is an integer of 1 to 10, $q$ and $r$ are integers whose ratio is from 1/1 to 10/1, and $y$ is an integer of 1 to about 100.

The cyanates of the above general formulas can be prepared in general by reducing the respective ester precursors to mono- or di-methylol-terminated compounds, viz, $F_3C(CFX)_mA(CFX)_mCH_2OH$ and

$$HOCH_2(CFX)_mB(CFX)_mCH_2OH$$

and reacting the latter with cyanogen halide in the presence of a base, such as triethylamine. The ester precursor starting materials themselves can be prepared from the respective fluorocarbon acids or acid halides by esterification with an alcohol. Application Ser. No. 622,099, filed Mar. 10, 1967, now abandoned, discloses oxy di(perfluoroacyl fluorides) which can be esterified to produce the corresponding esters, which upon being reduced to the methylol-terminated compounds (for example, in accordance with the disclosure in co-pending application Ser. No. 741,299 and cyanated in accordance with this invention, provide the dicyanates of general Formula VI above. U.S. Pats. 3,250,806 and 3,322,826 disclose polymeric acid fluorides and they can also be esterified, reduced, and cyanated in a similar manner to produce the cyanates of Formulas IV and VII above. U.S. Pat. 3,438,953 discloses methylol precursors which can be cyanated to provide the cyanates of Formula VII above.

The cyanation reaction of this invention is generally carried out by reacting the methylol precursors with an amount of cyanogen halide in excess of stoichiometric. Because of the exothermic nature of the reaction and the desire to prevent it from running away with consequent loss of methylol reactants, and because of the volatility of the cyanogen halide, low temperatures below the boiling points of the reactants are maintained. Generally, low temperatures in the range of —40 to 40° C., preferably —20 to 0° C., will be used in the reaction carried out in an inert liquid organic solvent. Solvents useful for this purpose representatively include acetone, ether, tetrahydrofuran, aromatic hydrocarbons such as benzene, toluene, and xylene, and halogenated aliphatic or aromatic hydrocarbons. The cyanation reaction is carried out in the presence of a base such as tertiary amines like triethylamine or an alkyl metal hydroxide such as sodium hydroxide, the amount of base used being sufficient to neutralize the hydrogen halide produced in the reaction (see German Pat. 1,190,184).

Cyanogen halides which can be used include cyanogen chloride (the preferred cyanating agent) and cyanogen bromide, these cyanating agents being well-known compounds which are commercially available or which can be prepared by well-known methods. Stoichiometrically, one mole of cyanogen halide is reacted with one equivalent of a hydroxyl group in the methylol reactant; however, we prefer to use an amount in excess of stoichiometric, e.g. cyanogen halide up to 50% excess.

After cyanation is completed, the cyanate product can be recovered from the reaction mixture by any suitable recovery procedure, such as precipitation, extraction, distillation, crystallization, etc. Preferably, the product is recovered by mixing the reaction mixture with a water-immiscible liquid organic solvent in which the cyanate is soluble, such as methylene chloride, xylene hexafluoride, or fluorocarbons such as Freon 113. The resulting solvent mixture is then poured into the ice water. The non-aqueous phase containing the cyanate is separated from the aqueous phase containing the neutralized halide, for example, by decanting, and can be dried, for example, over anhydrous magnesium sulfate, and filtered. The solvent can then be removed from cyanate by stripping, for example, under vacuum at room temperature.

We have found that above-described cyanates are particularly useful as monomers, intermediates or prepolymers for the preparation of fluorocarbon cyanurate polymers. Polymerization of the cyanates is accomplished by heating the cyanates to effect their thermal polytrimerization. Homopolymers of the cyanates as well as copolymers of two or more of said cyanates can be prepared in this fashion.

It is also within the scope of this invention to copolymerize one or more of said fluorocarbon mono- or dicyanates with one or more aromatic mono- or dicyanates of the prior art, such as those disclosed in German Pats. 1,190,184 and 1,195,764, Angew Chemie, 76, 303 (1964) and Acta Chem. Scand., 18, 826 (1964). Preferred aromatic cyanates useful in this invention for this purpose are those of the general formula:

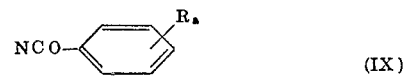

$$\phantom{xxx} NCO-\!\!\!\underset{}{\bigcirc}\!\!\!-\!\!\!\underset{}{\bigcirc}\!\!\!-R_a \qquad (IX)$$

where $R_a$ is hydrogen, cyanato, and an aromatic nuclei such as that derived from benzene, naphthalene, or biphenyl, or a plurality of aromatic nuclei separated by ether, carbonyl, sulfido, sulfonyl, or alkylene linkages such as —$CH_2$— or —$C(CH_3)_2$— which nuclei can have a cyanato group as a ring substituent. The amount of aromatic cyanate which can be copolymerized with the fluorocarbon cyanates of this invention can vary and generally will be dictated by the particular properties desired to be imparted by them to the cyanurate polymers. For example, the degree of strength of the polymer can be increased in some instances by incorporated aromatic cyanates. The heat distortion temperature of the polymer can also be modified by incorporating aromatic cyanates. Generally, where used, the aromatic cyanates will amount to 5 to 95 wt. percent preferably 5 to 50 wt. percent, of the cyanurate polymer.

The thermal polymerization of the cyanates, in accordance with this invention, involves trimerization of terminal cyanato groups to form a cyanurate. In the case where all of the cyanate used is a fluorocarbon monocyanate of Formula I, the polymerization can be illustrated as follows:

$$3F_3C(CFX)_mA(CFX)_mCH_2OCN \longrightarrow$$

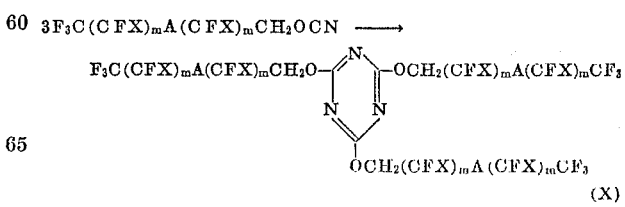

(X)

The product shown by Formula X is a simple tri-substituted cyanurate.

Where all of the cyanate monomeric material is the fluorocarbon dicyanate of Formula II, a three-dimensional network structure is formed with fluorocarbon linkages between cyanurate rings, the polymerization being illustrated as follows:

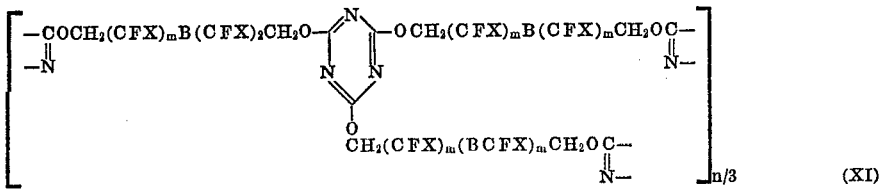

where $n$ is a multiple of 3 and can be as large as the number of molecules of dicyanate employed.

Where a monocyanate is copolymerized with a dicyanate, copolymeric cyanurates are formed in which the network growth and crosslinking density are reduced by the chain-terminating monocyanate monomer, whether the latter is a fluorocarbon monocyanate of this invention or a prior art aromatic monocyanate.

Where aromatic mono- and/or dicyanates are copolymerized with one or more of the fluorocarbon mono- or dicyanates of this invention, copolymers are produced with some aromatic linkages between cyanurate rings (as in the case of aromatic dicyanates) and/or with some chain-terminating aromatic groups attached to cyanurate rings (as in the case of aromatic monocyanates). These copolymers can be termed mixed fluorocarbon-aromatic polycyanurates.

Cyanurate polymers of this invention can broadly be illustrated by the generic formula:

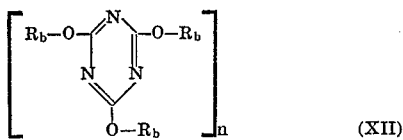

where $R_b$ is selected from the group consisting of:

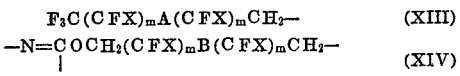

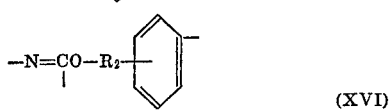

with the proviso that at least one of said $R_b$ groups is a fluorocarbon having the structure XIII and XIV, and where $R_1$ is hydrogen or one or a plurality of aromatic nuclei separated by ether, alkylene, linkages, etc., $R_2$ is an oxygen-to-carbon bond or one or a plurality of aromatic nuclei separated by ether, alkylene, linkages, etc., and where, in Formula XII, $n$ is 1 (which will be the case where all of the monomers are monocyanates) or a higher integer dependent on the functionality of the monomers where a dicyanate is included.

Generally, the polymerization of cyanates, in accordance with this invention, will be carried out by first melting the cyanate monomeric material to obtain a homogeneous melt and then raising the temperature in a range of 50 to 200° C., preferably 100 to 150° C. Alternatively, this polymerization can be carried out at lower temperatures, preferably 25 to 100° C. with the aid of activators, initiators or catalysts. These polymerization promoting agents representatively include Lewis acids, such as aluminum chloride, boron trifluoride, ferric chloride, titanium chloride, and zinc chloride; protonic acids, such as hydrochloric and other mineral acids; salts of weak acids, such as sodium acetate, sodium cyanide, sodium cyanate, potassium thiocyanate, sodium bicarbonate, and sodium boronate; and bases, such as sodium methoxide, sodium hydroxide, pyridine, triethylamine, and the like. Preferred catalysts are non-ionic coordination compounds, such as cobalt, iron, zinc, and copper acetyl acetonates. The amount of catalyst used can vary, and generally will be 0.5 to 5 mole percent, preferably 0.05 to 0.1 mole percent.

The polymerization of the cyanates can also be carried out by polymerizing them in solution or in suspension, using as a solvent or suspension medium the common organic solvents such as hydrocarbons, ketones, halogenated hydrocarbons, nitrated hydrocarbons, dimethylsulfoxide, dimethylformamide or ether. The solvent can be removed by distillation or simple evaporation during the course of, or at the end of the polymerization.

The cyanurate polymers of this invention possess stability at elevated temperatures along with resistance to solvents and corrosive chemicals. They can be used as one-component cured-in-place systems. Shaped articles having either plastic or elastomeric properties can be readily fabricated from these polymers. The fabrication of shaped articles is greatly facilitated by the fact that no volatile by-products are evolved during the curing process. The plastics are tough and strong with high glass transition and heat distortion temperatures, and the elastomeric compositions have glass transition temperatures below room temperature.

Generally, the plastics will have glass transition temperatures ($T_g$) of 20 to 250° C., tensile strengths of 3,000–4,000 p.s.i., and 10–70% elongation, and the elastomers will have glass transition temperatures ($T_g$) of —40 to 20° C., 50 to 300 p.s.i., tensile strengths and 50 to 500% elongation.

The polymers can be used for a variety of purposes, for example, they can be used as protective coatings, impregnants, foams, moldings, tooling compounds, structural adhesives, solid rocket propellent binders, laminating resins, organic solders, structural composites, such as boron filament composites, gaskets, liners, sealants for aircraft fuel tanks, as material for electrical insulation, etc. The polymers per se can be employed for such purposes or can be blended with fillers such as carbon black, silica, titanium oxide, etc.

EXAMPLES

The objects and advantages of this invention are further illustrated by the following examples, but it should be understood that the particular materials used in these examples, and the amounts thereof, and other conditions and details recited in these examples, should not be construed to unduly limit this invention.

Examples 1–8.—Preparation of cyanates

A number of cyanates of this invention were prepared by cyanating various fluoromethylol precursors with cyanogen chloride. In most runs, the methylol precursors themselves were prepared from respective ester starting materials by dissolving the ester in tetrahydrofuran, and reducing the ester to the methylol compound and sodium borohydride. The general cyanation procedure used was to add a solution of the fluoromethylol compound in cold acetone to a flask containing excess cyanogen chloride, and then adding triethylamine dropwise to the mixture, after which the reaction was permitted to proceed for about 15 min. at about —30 to —10° C. In Examples 1–5 and 8, methylene chloride was added to the reaction mixture and in Examples 6 and 7, hexafluoroxylene was added to the reaction mixture. The diluted reaction mixture was then poured into ice water to extract the triethylamine ammonium chloride by-product and acetone, the remaining halogenated hydrocarbon phase separated, dried over anhydrous magnesium sulfate, and filtered. The solvent was then removed from the cyanated product under vacuum at room temperature. A summary of these examples and a description of the cyanate products are set forth in Table I.

Examples 9–15.—Preparation of cyanate homopolymers

In these examples, the various cyanates of Examples 1–4 and 6–8 were homopolymerized by heating the cyanate at elevated temperatures. These examples and a description of the resulting homopolymers are summarized in Table II.

Examples 16–25.—Preparation of cyanate of copolymers

In these examples, a number of copolymers were prepared by mixing various fluorocarbon cyanates prepared as described above with each other or with various aromatic cyanates, and subjecting the resulting mixture to heat to effect thermal copolymerization. These examples and a description of the resulting copolymers are summarized in Table III.

TABLE I.—PREPARATION OF CYANATES

| Ex. | Starting material | Hydroxy cyanate precursor | Cyanate |
|---|---|---|---|
| 1 | (*) | $HOCH_2(CF_2)_3CH_2OH$ | $NCOCH_2(CF_2)_3CH_2OCN$ (Viscous liquid) |
| 2 | $H_3COOC(CF_2)_2O(CF_2)_2COOCH_3$ (B.P. 116–118° C./70 mm. Hg) | $HOCH_2(CF_2)_2O(CF_2)_2CH_2OH$ (B.P. 104–116° C./11 mm. Hg) | $NCOCH_2(CF_2)_2O(CF_2)_2CH_2OCN$ (Viscous liquid) |
| 3 | $H_3COOOCF_2CFCF_2CF_2COOCH_3$ \| $C_2F_5$ (B.P. 118–124° C./5 mm. Hg) | $HOCH_2CF_2CFCF_2CF_2CH_2OH$ \| $C_2F_5$ (B.P. 138–140° C./16 mm. Hg) | $NCOCH_2CF_2CFCF_2CF_2CH_2OCN$ \| $C_2F_5$ (Oil) |
| 4 | $H_3COOC(CF_2)_4COOCH_3$ | $HOCH_2(CF_2)_4CH_2OH$ (M.P. 67° C.) | $NCOCH_2(CF_2)_4CH_2OCN$ |
| 5 | $F_3C(CF_2)_6COOCH_3$ | $F_3C(CF_2)_6CH_2OH$ | $F_3C(CF_2)_6CH_2OCN$ (M.P. 85° C.) |
| 6 | $[(CF_2CF)_m(CH_2CF_2)_m(CF_2)_3COOCH_3]_2$ \| $CF_3$ (m/n=35/65 mol percent) (no. avg. M.W.=3,000) | $[(CF_2CF)_m(CH_2CF_2)_m(CF_2)_nCH_2OH]_2$ \| $CF_3$ (Viscous syrup) | $[(CF_2CF)_m(CH_2CF_2)_n(CF_2)_3CH_2OCN]_2$ \| $CF_3$ (Viscous syrup) |
| 7 | $[CH_3COOCF(OCF_2CF)_mO—]_2(CF_2)_5$ \| \| $CF_3$ $CF_3$ (M.W.=800) | $[HOCH_2CF(OCF_2CF)_mO—]_2(CF_2)_5$ \| \| $CF_3$ $CF_3$ (Viscous liquid) | $[NCOCH_2CF(OCF_2CF)_mO—]_2(CF_2)_5$ \| \| $CF_3$ $CF_3$ (Viscous liquid) |
| 8 | $H_3COOC(CF_2)_2O(CF_2)_4O(CF_2)_2COOCH_3$ | $HOCH_2(CF_2)_2O(CF_2)_4O(CF_2)_2CH_2OH$ (Viscous liquid) | $NCOCH_2(CF_2)_2O(CF_2)_4O(CF_2)_2CH_2OCN$ (Viscous liquid) |

*Cyanate precursor was commercially obtained.

TABLE II.—PREPARATION OF CYANURATE HOMOPOLYMERS

| Example | Cyanate monomer and polymerization conditions | Description of polymer product |
|---|---|---|
| 9 | Cyanate of Ex. 1 heated 45 min. at 300–400° F | Tough yellowish film with tensile strength of 3,300 p.s.i., 10% elongation, and a $T_g$ o 72–90° C. |
| 10 | Cyanate of Ex. 2 heated 45 min. at 300–400° F | Clear flexible film of light yellow color with tensile strength of 830 p.s.i., 70% elongation, and a $T_g$ of 28–48° C. |
| 11 | Cyanate of Ex. 3 heated 45 min. at 300–400° F | Tough film with tensile strength of 2,400 p.s.i., 4% elongation and a $T_g$ of 44–47° C. |
| 12 | Cyanate of Ex. 4 heated 45 min. at 300–350° F | Tough clear yellow-brownish plastic. |
| 13 | Cyanate of Ex. 6 heated 2 hrs. at 300–350° F | Rubbery polymer with tensile strength of 110 p.s.i., 200% elongation and $T_g$ of 0–10° C. (when heated for another hour at 500° F., it had tensile strength of 140 p.s.i. and 200% elongation). |
| 14 | Cyanate of Ex. 7 heated 2 hrs. at 350° F | Soft rubbery polymer. |
| 15 | Cyanate of Ex. 8 heated 45 min. at 300–350° F | Strong elastomeric polymer with $T_g$ of −6 to 6° C., tensile strength of 270 p.s.i., and 40% elongation. |

TABLE III.—PREPARATION OF CYANURATE COPOLYMERS

| | Cyanate monomers | | Polymerization | |
|---|---|---|---|---|
| Example | Formula | Amt. mols | temp., ° F. | Description of cyanurate polymer |
| 16 | $F_3C(CF_2)_6CH_2OCN$ plus $NCOCH_2(CF_2)_3CH_2OCN$ | 1.0 2.5 | 300–350 | Clear, yellow-brown flexible film. |
| 17 | $NCOCH_2(CF_2)_3CH_2OCN$ plus $NCO$—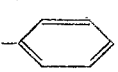—$O$— | 1.5 1.0 | 150–200 | Rigid plastic—Calculated: C, 46.5; 9.2; F, 28.3. Found: C, 43.6; N, 9.2; F, 29.1. |
| 18 | $NCOCH_2(CF_2)_3CH_2OCN$ plus $NCO$——$O$——$O$—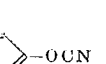—$OCN$ | 2.0 1.0 | 200 | Clear, tough plastic film—Calculated: C, 47.0; N, 9.6; F, 26.2. Found: C, 50.1; N, 9.5; F, 26.2. |
| 19 | $NCOCH_2(CF_2)_2O(CF_2)_2CH_2OCN$ plus $NCO$——$O$——$OCN$ | 1.0 1.0 | 200 | Clear, tough, flexible film, $T_g$ 85–120° C. |

TABLE III—Continued

| Example | Cyanate monomers Formula | Amt. mols | Polymerization temp., °F. | Description of cyanurate polymer |
|---|---|---|---|---|
| 20 | $[(CF_2CF)_m(CH_2CF_2)(CF_2)_3CH_2OCN]_2$ with $CF_3$ branch; plus $NCOCH_2CF_2CFCF_2CF_2CH_2OCN$ with $C_2F_5$ branch | 0.1 / 1.0 | 350 | Clear elastomeric film, $T_g$ 4–39° C. |
| 21 | $NCOCH_2CF_2CFCF_2CF_2CH_2OCN$ with $C_2F_5$; plus $[NCOCH_2CF(OCF_2CF)O-]_2(CF_2)_5$ with $CF_3$, $CF_3$ | 2.0 / 1.0 | 300–350 | Clear highly flexible film. |
| 22 | $NCOCH_2CF_2CFCF_2CF_2CH_2OCN$ with $C_2F_7$; plus $NCO-\text{C}_6H_4-C(CH_3)_2-C_6H_4-OCN$ | 2.0 / 2.0 | 150–200 | Clear, tough yellow-orange film, $T_g$ 105–130° C. |
| 23 | $NCOCH_2CF_2CFCF_2CF_2CH_2OCN$ (Ex. 3) with $C_2F_5$; plus $NCO-\text{C}_6H_4-OCN$ | 0.1 / 0.9 | 350 | Clear tough yellow-brown film, $T_g$ 225–250° C. |
| 24 | $NCOCH_2CF_2CFCF_2CF_2CH_2OCN$ (Ex. 3) with $C_2F_5$; plus $NCO-\text{C}_6H_4-O-C_6H_4-OCN$ | 1.0 / 1.0 | 150 | Clear, tough film, $T_g$ 115–135° C. |
| 25 | $NCOCH_3CF_2CFCF_2CF_2CH_2OCN$ (Ex. 3) with $C_2F_5$; plus $NCO-\text{C}_6H_4-O-C_6H_4-OCN$ | 1.5 / 1.8 | 300–350 | Clear, tough film, $T_g$ 80–95° C. |

Various modifications and alterations of this invention will become apparent to those skilled in the art without departing from the scope and spirit of this invention, and it should be understood that this invention is not to be unduly limited to the illustrative embodiment set forth herein.

We claim:

1. Mono-cyanurate of the formula

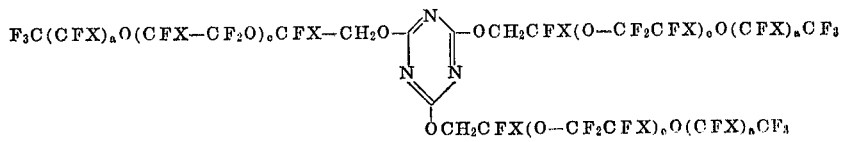

where X is fluorine or perfluoroalkyl, $a$ is an integer of 1 to 10, and $c$ is an integer of 1 to 100.

2. Polycyanurate of the formula

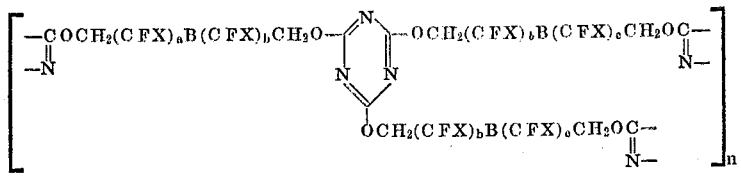

where B is (1) a carbon-to-carbon bond, in which case $a$ is an integer of 1 to 30 and $b$ is zero, or (2) B is $[(CFX)_dO(CFX)_e]_f$, in which case $a$ and $b$ are zero, $d$ and $e$ are integers of 1 to 30, and $f$ is an integer of 1 to 20, or (3) is

in which case $a$ and $b$ are 1, $h$ is an integer of 1 to 10, and $g$ and $i$ are integers of 1 to 100, or (4) B is

in which case $a$ and $b$ are integers of 1 to 10, $j$ and $k$ are integers whose ratio $j/k$ is 1/1 to 10/1, $m$ is an integer of 1 to 100, and $(CH_2CH_2)$ and $(CF_2—CFX)$ are randomly distributed units; and where X in all instances where it appears in this claim is fluorine or perfluoroalkyl and $n$ is greater than 1.

3. Polycyanurate of the formula

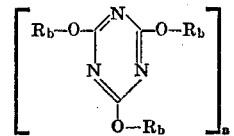

where one or two of the $R_b$ moieties have the structure:

$$F_3C(CFX)_aA(CFX)_bCH_2— \quad (I)$$

where A is a carbon-to-carbon bond, in which case $a$ is an integer of 1 to 30 and $b$ is zero, or A is $-O(CFX-CF_2O)_c$, in which case $a$ is an integer of 1 to 10, $b$ is 1, and $c$ is an integer of 1 to 100; and the remaining $R_b$ moieties have the structure:

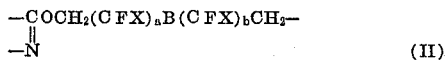
(II)

where B is (1) a carbon-to-carbon bond, in which case $a$ is an integer of 1 to 30 and $b$ is zero, or (2) B is $[(CFX)_dO(CFX)_e]_f$, in which case $a$ and $b$ are zero, $d$ and $e$ are integers of 1 to 30, and $f$ is an integer of 1 to 20, or (3) B is $(OCF_2-CFX)_gO(CFX)_hO(CFX-CF_2O)_i$ in which case $a$ and $b$ are 1, $h$ is an integer of 1 to 10, and $g$ and $i$ are integers of 1 to 100, or (4) B is $[(CF_2CH_2)_j(CF_2-CFX)_k]_m$, in which case $a$ and $b$ are integers of 1 to 10, $j$ and $k$ are integers whose ratio $j/k$ is 1/1 to 10/1, $m$ is an integer of 1 to 100, and $(CF_2CH_2)$ and $(CF_2-CFX)$ are randomly distributed units; and where X in all instances where it appears in this claim is fluorine or perfluoroalkyl and $n$ is greater than 1.

4. Cyanurate of the formula

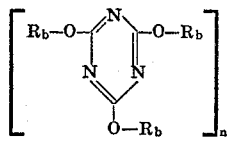

where $R_b$ is selected from the group consisting of $F_3C(CFX)_aA(CFX)_bCH_2-$ (I)

where A is a carbon-to-carbon bond, in which case $a$ is an integer of 1 to 30 and $b$ is zero, or A is $-O(CFX-CFO)_c$ in which case $a$ is an integer of 1 to 10, $b$ is 1, and $c$ is an integer of 1 to 100;

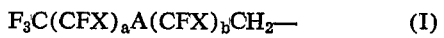
(II)

where B is (1) a carbon-to-carbon bond, in which case $a$ is an integer of 1 to 30 and $b$ is zero, or (2) B is $[(CFX)_dO(CFX)_e]_f$, in which case $a$ and $b$ are zero, $d$ and $e$ are integers of 1 to 30, and $f$ is an integer of 1 to 20, or (3) B is $(OCF_2-CFX)_gO(CFX)_hO(CFX-CF_2O)_i$ in which case $a$ and $b$ are 1, $h$ is an integer of 1 to 10, and $g$ and $i$ are integers of 1 to 100, or (4) B is $[(CF_2CH_2)_j(CF_2-CFX)_k]_m$, in which case $a$ and $b$ are integers of 1 to 10, $j$ and $k$ are integers whose ratio $j/k$ is 1/1 to 10/1, $m$ is an integer of 1 to 100, and $(CF_2CH_2)$ and $(CF_2-CFX)$ are randomly distributed units;

(III)

where $R_1$ is hydrogen or one or a plurality of aromatic nuclei separated by ether or alkylene linkages; and

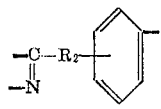
(IV)

where $R_2$ is an oxygen-to-carbon bond or one or a plurality of aromatic nuclei separated by ether or alkylene linkages;
where X in all of the instances where it appears in this claim is fluorine or perfluoroalkyl, and $n$ is 1 or greater, with the proviso that where $n$ is 1 and $R_b$ is of said Formula I, then A has said structure $-O(CFX-CF_2-O)_c$.

5. Polycyanurate of claim 2 wherein B is a carbon-to-carbon bond, $a$ is an integer of 1 to 30, $b$ is zero, and said perfluoroalkyl is perfluoromethyl.

6. Polycyanurate of claim 2 wherein B is $[(CFX)_dO(CFX)_e]_f$ $a$ and $b$ are zero, $d$ and $e$ are integers of 1 to 30, $f$ is an integer of 1 to 20, and said perfluoroalkyl is perfluoromethyl.

7. Polycyanurate of claim 2 wherein B is $(OCF_2-CFX)_gO(CFX)_hO(CFX-CF_2)_i$ $a$ and $b$ are 1, $h$ is an integer of 1 to 10, $g$ and $i$ are integers of 1 to 100, and said perfluoroalkyl is perfluoromethyl.

8. Polycyanurate of claim 2 wherein B is $[(CF_2CH_2)_j(CF_2-CFX)_k]_m$ $a$ and $b$ are integers of 1 to 10, $j$ and $k$ are integers whose ratio $j/k$ is 1/1 to 10/1, $m$ is an integer of 1 to 100

$(CF_2CH_2)$ and $(CF_2-CFX)$ are randomly distributed units, and said perfluoroalkyl is perfluoromethyl.

9. A process for preparing cyanurates which comprises heating one or more fluorocarbon cyanates having a backbone comprising one or a multiplicity of $-CFX-$ units, said backbone being terminated with a cyanomethyl group on each end or with a cyanomethyl group on one end and a $CF_3$ group on the other end, where blocks of said $-CFX-$ units in said backbone can be separated by ether linkages, methylene linkages, or ether and methylene linkages, and where X is fluorine or perfluoromethyl.

10. A process according to claim 9 which comprises heating one or more of said cyanates together with one or more aromatic mono- or dicyanates.

References Cited
UNITED STATES PATENTS

| | | | |
|---|---|---|---|
| 2,741,606 | 4/1956 | Holt et al. | 260—248 |
| 2,858,310 | 10/1958 | Grundmann et al. | 260—248 XR |
| 2,947,736 | 8/1960 | Lundberg | 260—88.3 |
| 2,994,595 | 8/1961 | Condo et al. | 260—248 XR |
| 3,037,979 | 6/1962 | Fukui et al. | 260—248 |
| 3,347,901 | 10/1967 | Fritz et al. | 260—248 XR |
| 3,525,745 | 8/1970 | Anderson | 260—248 |

DONALD E. CZAJA, Primary Examiner

H. S. COCKERAM, Assistant Examiner

U.S. Cl. X.R.

117—161 UN; 161—189, 190; 260—2.5 AN, 37 N, 248 R, 453 A

UNITED STATES PATENT OFFICE
CERTIFICATE OF CORRECTION

Patent No. 3,681,292            Dated  August 1, 1972

Inventor(s)  Basil L. Loudas and Herward A. Vogel

It is certified that error appears in the above-identified patent and that said Letters Patent are hereby corrected as shown below:

Lines 1-8 of Columns 5 and 6 should read --

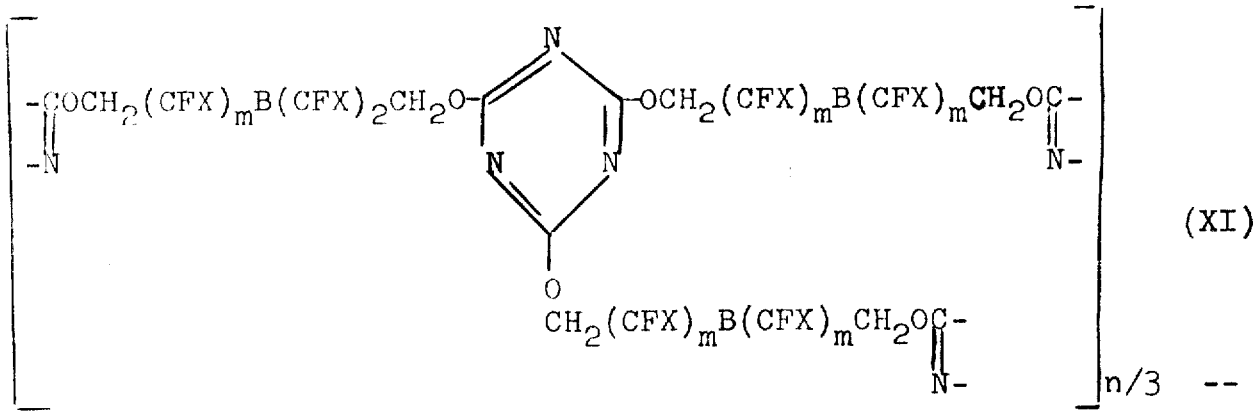

Column 8, the Cyanate formula for Example 7 in Table I should read

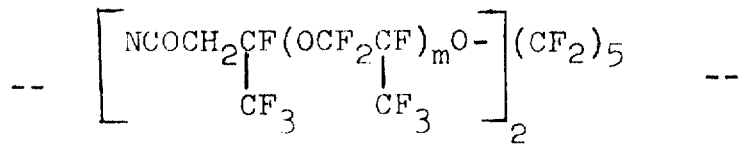

Column 8, the calculated value "9.2" (appearing in the last column of Table III) for Example 17 should read -- N, 9.2; --.

Column 11, line 38, the formula should read

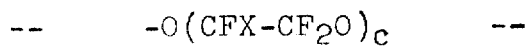

UNITED STATES PATENT OFFICE
CERTIFICATE OF CORRECTION

Patent No. 3,681,292  Dated  August 1, 1972

Inventor(s)  Basil L. Loudas and Herward A. Vogel   - 2 -

It is certified that error appears in the above-identified patent and that said Letters Patent are hereby corrected as shown below:

Column 11, line 60, formula III should read

-- 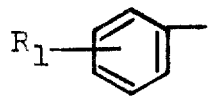 --

Signed and sealed this 9th day of January 1973.

(SEAL)
Attest:

EDWARD M. FLETCHER, JR.
Attesting Officer

ROBERT GOTTSCHALK
Commissioner of Patents